United States Patent
Barhorst et al.

(10) Patent No.: US 10,646,965 B2
(45) Date of Patent: May 12, 2020

(54) TUBULAR WELDING WIRE WITH A THINNER SHEATH FOR IMPROVED DEPOSITION RATES

(71) Applicant: Hobart Brothers LLC, Troy, OH (US)

(72) Inventors: Steven Edward Barhorst, Sidney, OH (US); Joseph C. Bundy, Piqua, OH (US); Michael Scott Bertram, Troy, OH (US)

(73) Assignee: Hobart Brothers LLC, Troy, OH (US)

( * ) Notice: Subject to any disclaimer, the term of this patent is extended or adjusted under 35 U.S.C. 154(b) by 31 days.

(21) Appl. No.: 15/151,662

(22) Filed: May 11, 2016

(65) Prior Publication Data
US 2017/0043434 A1 Feb. 16, 2017

Related U.S. Application Data

(60) Provisional application No. 62/203,627, filed on Aug. 11, 2015.

(51) Int. Cl.
*B23K 35/22* (2006.01)
*B23K 35/40* (2006.01)
(Continued)

(52) U.S. Cl.
CPC .............. *B23K 35/304* (2013.01); *B23K 9/00* (2013.01); *B23K 35/0255* (2013.01);
(Continued)

(58) Field of Classification Search
CPC .................... B23K 35/22–4; B23K 35/40–406
(Continued)

(56) References Cited

U.S. PATENT DOCUMENTS 2,345,758 A * 4/1944 Lincoln .............. B23K 35/0272
219/137 R
2,983,808 A * 5/1961 Cresswell ................ B23K 9/14
219/137.44
(Continued)

FOREIGN PATENT DOCUMENTS

CA 1104040 6/1981
CN 101164731 4/2008
(Continued)

OTHER PUBLICATIONS

"304/304L Stainless Steel Product Data Sheet," AK Steel Corporation, Jan. 1, 2007, http://www.aksteel.com/pdf/markets_products/stainless/austenitic/304_3041_data_sheet.pdf.
(Continued)

*Primary Examiner* — Michael A LaFlame, Jr.
(74) *Attorney, Agent, or Firm* — McAndrews, Held & Malloy, Ltd.

(57) ABSTRACT

The disclosure relates generally to welding and, more specifically, to tubular welding wires for arc welding processes, such as Gas Metal Arc Welding (GMAW), Flux Core Arc Welding (FCAW), and Submerged Arc Welding (SAW). The tubular welding wire includes a metal sheath surrounding a granular core. The metal sheath includes greater than approximately 0.6% manganese by weight and greater than approximately 0.05% silicon by weight. Further, the metal sheath has a thickness of between approximately 0.008 inches and approximately 0.02 inches.

28 Claims, 6 Drawing Sheets

(51) Int. Cl.
*B23K 35/30* (2006.01)
*B23K 35/02* (2006.01)
*C22C 38/04* (2006.01)
*C22C 38/02* (2006.01)
*B23K 9/00* (2006.01)

(52) U.S. Cl.
CPC ...... *B23K 35/0261* (2013.01); *B23K 35/0266* (2013.01); *B23K 35/40* (2013.01); *B23K 35/406* (2013.01); *C22C 38/02* (2013.01); *C22C 38/04* (2013.01)

(58) Field of Classification Search
USPC .......................................... 219/145.1–146.52
See application file for complete search history.

(56) References Cited

U.S. PATENT DOCUMENTS

| | | | | |
|---|---|---|---|---|
| 3,076,888 | A | * | 2/1963 | Arnoldy ................... B23K 9/04 219/73 |
| 3,303,323 | A | * | 2/1967 | Claussen ............ B23K 35/0266 148/26 |
| 3,421,890 | A | * | 1/1969 | Baumel .............. B23K 35/3046 106/1.05 |
| 3,423,565 | A | * | 1/1969 | Malchaire .......... B23K 35/0261 219/146.3 |
| 3,424,892 | A | | 1/1969 | Wilcox |
| 3,428,442 | A | * | 2/1969 | Yurasko, Jr. ............. B22F 1/025 427/427 |
| 3,495,069 | A | | 2/1970 | Cavanah |
| 3,767,388 | A | * | 10/1973 | Asakura ............. B23K 35/3086 420/68 |
| 3,848,109 | A | | 11/1974 | Zvanut |
| 3,999,036 | A | * | 12/1976 | Muratov ............ B23K 35/0266 219/145.22 |
| 4,072,845 | A | * | 2/1978 | Buckingham ........ B23K 35/368 219/146.3 |
| 4,843,212 | A | | 6/1989 | Shneerov |
| 5,171,968 | A | * | 12/1992 | Bates ................... B23K 35/304 219/146.22 |
| 5,192,851 | A | * | 3/1993 | James ..................... B23K 9/09 219/130.51 |
| 5,378,871 | A | | 1/1995 | Nishikawa |
| 5,525,779 | A | | 6/1996 | Santeila |
| 6,042,782 | A | | 3/2000 | Murata |
| 6,835,913 | B2 | | 12/2004 | Duncan |
| 7,863,538 | B2 | | 1/2011 | Barhorst |
| 8,043,407 | B2 | | 10/2011 | Nako |
| 8,519,303 | B2 | | 8/2013 | Katiyar |
| 8,563,897 | B2 | | 10/2013 | Duncan |
| 8,664,567 | B2 | | 3/2014 | Hartman |
| 8,791,389 | B2 | | 7/2014 | James |
| 2005/0155960 | A1 | * | 7/2005 | Bonnet .............. B23K 35/3053 219/137 WM |
| 2005/0205525 | A1 | | 9/2005 | Barhorst |
| 2006/0165552 | A1 | * | 7/2006 | Kapoor ............. B23K 35/0261 420/70 |
| 2010/0206130 | A1 | * | 8/2010 | Nako ................. B23K 35/0261 75/302 |
| 2013/0270244 | A1 | | 10/2013 | Barhorst |
| 2014/0131338 | A1 | | 5/2014 | Postle |

FOREIGN PATENT DOCUMENTS

| | | |
|---|---|---|
| CN | 101402161 | 4/2009 |
| CN | 102225495 | 10/2011 |
| CN | 102601547 | 7/2012 |
| CN | 103480984 | 1/2014 |
| CN | 103659051 | 3/2014 |
| CN | 104028913 | 9/2014 |
| CN | 104245208 | 12/2014 |
| CN | 104259690 | 1/2015 |
| CN | 104646856 | 5/2015 |
| CN | 104646868 | 5/2015 |
| CN | 104741824 | 7/2015 |
| CN | 104741829 | 7/2015 |
| FR | 2513920 | 4/1983 |
| GB | 1160156 | 7/1969 |
| GB | 1313292 | 4/1973 |

OTHER PUBLICATIONS

Unknown, AISI Steel Grades, http://en.wikipedia.org/wiki/AISI_steel_grades.
Unknown, Ask the Experts, http://www.lincolnelectric.com/knowledge/articles/content/stainlesssteel.asp.
Unknown, Gas Metal Arc Welding Equipment, http://en.wikipedia.org/wiki/Gas_metal_arc_welding#Equipment.
Unknown, Guidelines to Gas Metal Arc Welding, Hobart.
Unknown, Metal-Cored Wire is Suited for Robotic MIG Welding, http://news.thomanet.com/fullstory/456519.
Unknown, MIG Welding Tips, Hobart.
Unknown, Stainless Steel—Type of Stainless steel, http://en.wikipedia.org/wiki/Stainless_steel#Types_of_stainless_steel.
Unknown, Welding Wire, http://www.hobartwelders.com/weldit/filler_metals/weldwire.html.
Canadian Office Action Appln. No. 2,937,562 dated Jun. 6, 2018 (4 pgs).
Klas Weman: "Welding processes handbook", Jan. 1, 2011, (Jan. 1, 2011), p. 83, XP055636230, [retrieved on Oct. 28, 2019).

* cited by examiner

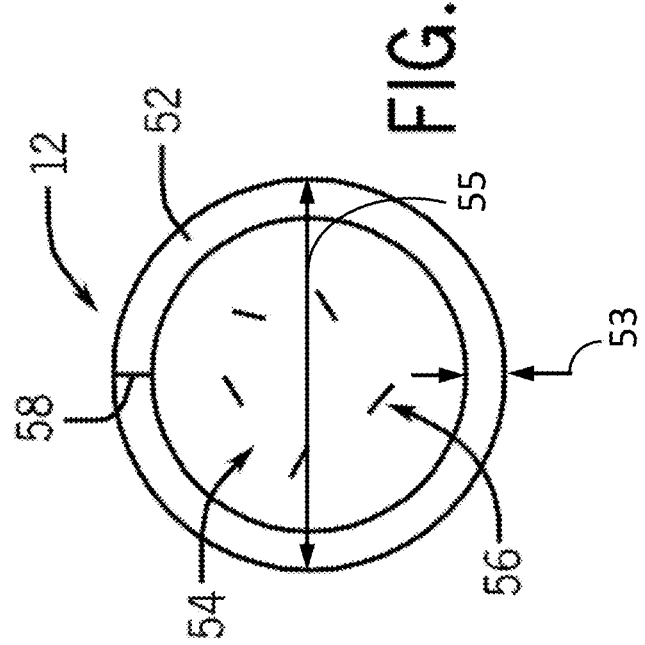

TUBULAR WELDING WIRE WITH A THINNER SHEATH FOR IMPROVED DEPOSITION RATES

CROSS-REFERENCE TO RELATED APPLICATION

This application claims priority to and the benefit of U.S. Provisional Application Ser. No. 62/203,627, entitled "TUBULAR WELDING WIRE WITH A THINNER SHEATH FOR IMPROVED DEPOSITION RATES", filed Aug. 11, 2015, which is hereby incorporated by reference in its entirety for all purposes.

BACKGROUND

The disclosure relates generally to welding and, more specifically, to tubular welding wires for arc welding processes, such as Gas Metal Arc Welding (GMAW), Flux Core Arc Welding (FCAW), and Submerged Arc Welding (SAW).

Welding is a process that has become ubiquitous in various industries for a variety of applications. For example, welding is often used in applications such as shipbuilding, offshore platform, construction, pipe mills, and so forth. Certain welding techniques (e.g., GMAW, SAW, or FCAW), typically employ a welding electrode in the form of welding wire. Welding wire may generally provide a supply of filler metal for the weld, as well as provide a path for the current during the welding process.

BRIEF DESCRIPTION

In an embodiment, a tubular welding wire includes a metal sheath surrounding a granular core. The metal sheath includes greater than approximately 0.6% manganese by weight and greater than approximately 0.05% silicon by weight. Further, the metal sheath has a thickness of between approximately 0.008 inches and approximately 0.02 inches.

In another embodiment, a method of manufacturing a tubular welding wire includes disposing a granular core inside of a metallic sheath, wherein the metal sheath includes greater than approximately 0.6% manganese by weight and greater than approximately 0.05% silicon by weight, and wherein the metal sheath has a thickness of between approximately 0.008 inches and approximately 0.02 inches. The method includes compressing the granular core within the metallic sheath to yield the tubular welding wire, wherein the tubular welding wire has a diameter between approximately 0.03 inches and approximately 0.25 inches.

DRAWINGS

These and other features, aspects, and advantages of the present disclosure will become better understood when the following detailed description is read with reference to the accompanying drawings in which like characters represent like parts throughout the drawings, wherein:

FIG. 2 is a cross-sectional view of a tubular welding electrode, in accordance with embodiments of the present disclosure;

DETAILED DESCRIPTION

Figure 1A:
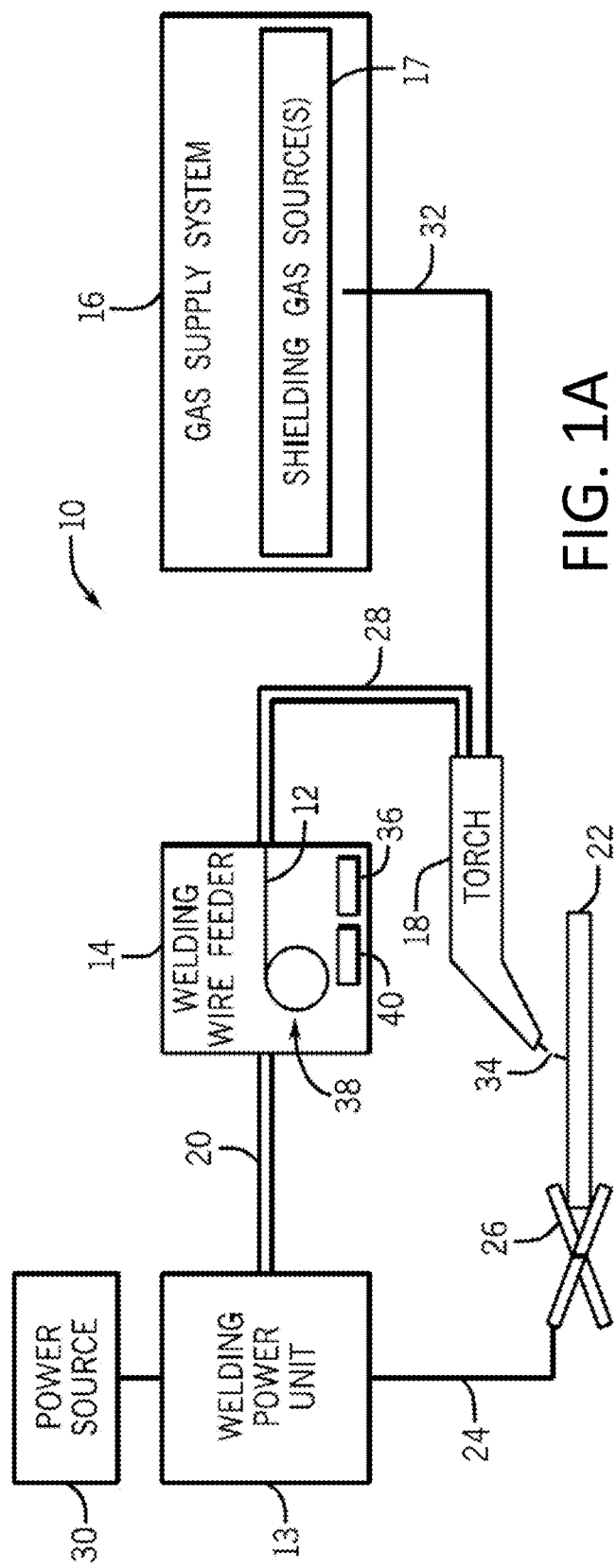
FIG. 1A is a block diagram of a gas metal arc welding (GMAW) system, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The presently disclosed tubular welding wire embodiments may include one or more components (e.g., flux, arc stabilizers, or other additives) that generally alter the welding process and/or the properties of the resulting weld. Furthermore, in addition to the composition, it may be desirable for the tubular welding wire to have certain physical properties as well. For example, since the tubular welding wire is consumed during welding, it may be fed to the welding torch from a spool (e.g., in a welding wire feeder). As such, if, for example, the stiffness of the welding wire is too low, then the welding wire may crumple, tangle, or otherwise improperly feed when the welding wire meets resistance during unspooling and/or feeding. It is presently recognized that this is especially a problem for larger diameter tubular welding wires, which may generally be more prone to buckling. When the tubular welding wire buckles while feeding, it may form a tangled "bird's nest" that generally wastes welding wire and operator time as well as, in certain circumstances, adversely affecting operations of the welding system (e.g., welding wire feeder, wire spool, or similar wire feeding components of the welding system). Additionally, when the stiffness of a larger diameter welding wire is too low, the wire may be more likely to crush (e.g., making the tubular wire have an "egg" shape"), which may result in slippage and/or other inconsistencies in wire feeding that may have deleterious effects to the welding process. Accordingly, it may be desirable to have welding wire with a greater stiffness so that the wire will be less likely to experience unspooling or feeding issues during the welding process. Further, it is presently believed that by improving the stiffness and/or toughness of the sheath, relatively thin-sheath, large diameter tubular welding wire may be produced that provides suitable physical properties for feeding while also enabling higher deposition rates.

With the foregoing in mind, the tubular welding wire embodiments described herein have a metal sheath that includes one or more components, alloying elements such as manganese and/or silicon, which may not be included in metal sheaths of other welding wires at the levels presently disclosed. It should be appreciated that these components may include components that are provided by the granular core of conventional welding wires. Moreover, certain disclosed tubular welding wire embodiments also possess superior physical properties (i.e., stiffness, hardness, and/or toughness) as a result of having these components loaded into the metal sheath rather than the granular core. In particular, the certain disclosed tubular welding wire embodiments include a substantially higher (e.g., two to three times higher) manganese content than conventional metal sheaths, which may improve the stiffness of the tubular welding wire and serve to increase the manganese content of the weld. Additionally, certain tubular welding wire embodiments include substantially higher (e.g., two to ten times higher) silicon content than certain conventional metal sheaths, which may also improve the stiffness of the tubular welding wire and serve to increase the silicon content in the weld. As such, the presently disclosed tubular welding wire enables greater flexibility in the selection of components for the granular core since at least a portion of these components may instead be delivered by the metal sheath. The improved physical properties of the disclosed metal sheaths enable the production of tubular welding wires having a thinner sheath (e.g., less than 0.028 inches, less than 0.020 inches, less than or equal to 0.016 inches, less than or equal to 0.014 inches, less than or equal to 0.008 inches thick) and higher granular core loading (e.g., wherein the granular core accounts for greater than 25%, greater than 30%, or greater than 40% of the total weight of the wire), which should enable higher deposition rates than other welding wires, as discussed in greater detail below. Furthermore, it should be appreciated that, while the present discussion is generally directed toward tubular welding wire, in other embodiments, the present technique may be used to produce other welding consumables (e.g., welding rods).

Since the mechanical properties of the disclosed metal sheath are improved by the presence of the aforementioned alloying elements, a thinner metal sheath may be used to manufacture certain embodiments of the tubular welding wire. As discussed below, this thinner metal sheath enables the production of tubular welding wires with higher granular core loading. Beyond the improved feeding mentioned above, the disclosed thin-sheath tubular welding wires are believed to enable higher wire feed speeds and deposition rates than comparable conventional tubular welding wires when welding at similar amperages. Additionally or alternatively, the disclosed thin-sheath tubular welding wires are believed to enable similar deposition rates as comparable conventional welding wires while using less amperage, which results in less heat being delivered to the surface of the workpiece and a smaller heat affected zone (HAZ). It may be appreciated that this reduced heat delivery can substantially reduce heat-induced distortion of portions of the workpiece near the weld, especially for thinner workpieces. For example, for ship welding applications, the panels of the hull are relatively thin and are generally welded to stiffeners using a substantial amount of fillet welds, and a large ship can include miles of fillet welds. For such applications, it may be desirable to use a welding wire that provides a high deposition rate to reduce the total weld time and improve the efficiency of the welding operation; however, conventional welding wires can deliver too much heat to the workpiece at high deposition rates, resulting in unacceptable burn-through of the workpiece. In contrast, by delivering less heat to the workpiece during the welding operation, embodiments of the presently disclosed thin-sheath tubular welding wire enable the welding of thin workpieces at high deposition rates without causing burn-through of the workpiece or creating as large a HAZ.

Generally speaking, there are advantages to utilizing a tubular welding wire in which one or more components typically found in the granular core of the tubular welding wire are instead provided by the metal sheath, as presently disclosed. That is, certain components may be present within the granular core of a conventional tubular welding wire that contribute to the chemistry of the weld. It may be appreciated that, when comparing two tubular welding wires having the same diameter and different sheath thicknesses, the welding wire with the thinner sheath necessarily affords a greater internal volume and, therefore, enables a higher granular core loading. Additionally, considering the finite internal volume of a tubular welding wire, by moving one or more components (e.g., manganese and/or silicon sources) from the granular core and into the metal sheath, even more space may be available in the core of the tubular welding wire for other components (e.g., other metals, fluxes, stabilizers, or similar components).

Generally speaking, the manganese and silicon content provided by the metal sheath of the presently disclosed tubular welding wire may deoxidize the weld pool, and also aid in weld pool wetting of the base metal during the welding operation. Silicon, by specific example, may enable improved weld-bead wetting. For the disclosed embodiments, the relative manganese and silicon content included in the metal sheath may be balanced in order to balance the desired chemical properties (e.g., the deoxidation and wetting properties) and mechanical properties (e.g., stiffness, strength, workability). It may be appreciated that the greater internal volume and higher granular core loading enabled by the disclosed tubular welding wires allows for greater flexibility in the chemistry of the resulting weld deposit. For example, in certain embodiments, a particular high alloy metal strip may be used to manufacture a number of different welding wires, wherein the composition of the weld deposit can be dominated by the alloying components disposed within the granular cores of these wires. Furthermore, the additional internal volume afforded by tubular welding wire embodiments of the present approach may be dedicated to other additives to control additional aspects of the welding operation and/or the weld deposit (e.g., wettability, strength, toughness, appearance).

Furthermore, by moving one or more components (e.g., manganese and/or silicon sources) from the granular core and into the metallic sheath, the chemistry of the welding process may also be varied. For example, placing certain components (e.g., manganese and/or silicon sources) in the metallic sheath rather than the granular core may enable more freedom to select other components for the granular core (e.g., including components that are not otherwise compatible with the manganese and/or silicon sources). By further example, in certain embodiments, by placing one or more components (e.g., manganese and/or silicon sources) in the metallic sheath rather than in the granular core, a greater portion of these components may become incorporated into the weld metal (e.g., rather than react with other components in the granular core and/or form fumes).

Accordingly, it may be desirable to instead use the metal sheath of the tubular welding wire to deliver these components to the weld.

Turning to the figures, FIG. 1A is a block diagram of an embodiment of a gas metal arc welding (GMAW) system 10 that utilizes a tubular welding wire 12, in accordance with the present disclosure. It should be appreciated that, while the present discussion focuses on the GMAW system 10 illustrated in FIG. 1A, the presently disclosed welding wire may benefit any arc welding process (e.g., FCAW, FCAW-G, GTAW, SAW, or similar arc welding process) that uses a tubular welding wire (e.g., a tubular welding electrode or rod). It should be appreciated that certain welding system embodiments (e.g., SAW welding systems or GTAW welding systems) using the disclosed welding wire or electrode may include components not illustrated in the example GMAW system 10 (e.g., a flux hopper, a flux delivery component, a rod welding electrode, etc.) and/or not include components that are illustrated in the example GMAW system 10 (e.g., the gas supply system 16). It should also be appreciated that, in other embodiments, the presently disclosed tubular welding wire may be utilized as a "cold welding wire," in which the tubular welding wire does not carry the current (e.g., does not form the arc to the surface of the workpiece) during the welding process. In certain embodiments, the welding system 10 may be manually operated by a human welder. In other embodiments, the welding system 10 may be a robotic welding system that is capable of producing high quality welds at higher wire feed speeds (e.g., greater than approximately 275 inches per minute, greater than approximately 300 inches per minute) and higher deposition rates (e.g., greater than approximately 25 pounds per hour, greater than approximately 30 pounds per hour) than may be practical or sustainable for a human welder, especially for more challenging welds (e.g., fillet welds).

The illustrated welding system 10 of FIG. 1A includes a welding power unit 13, a welding wire feeder 14, a gas supply system 16, and a welding torch 18. The welding power unit 13 generally supplies power to the welding system 10 and may be coupled to the welding wire feeder 14 via a cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire 12 (e.g., the welding electrode) and power to the welding torch 18 during operation of welding system 10. In another embodiment, the welding power unit 13 may couple and directly supply power to the welding torch 18.

The welding power unit 13 may generally include power conversion circuitry that receives input power from an alternating current power source 30 (e.g., an AC power grid, an engine/generator set, or a combination thereof), conditions the input power, and provides DC or AC output power via the cable 20. As such, the welding power unit 13 may power the welding wire feeder 14 that, in turn, powers the welding torch 18, in accordance with demands of the welding system 10. The lead cable 24 terminating in the clamp 26 couples the welding power unit 13 to the workpiece 22 to close the circuit between the welding power unit 13, the workpiece 22, and the welding torch 18. The welding power unit 13 may include circuit elements (e.g., transformers, rectifiers, switches, and so forth) capable of converting the AC input power to a direct current electrode positive (DCEP) output, direct current electrode negative (DCEN) output, DC variable polarity, or a variable balance (e.g., balanced or unbalanced) AC output, as dictated by the demands of the welding system 10. It should be appreciated that the presently disclosed tubular welding wire 12 may enable improvements to the welding process (e.g., improved wire feeding, improved arc stability, and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In other embodiments, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via the conduit 32) may include Ar, Ar/$CO_2$ mixtures, Ar/$CO_2$/$O_2$ mixtures, Ar/He mixtures, and so forth.

Accordingly, the illustrated welding torch 18 generally receives the tubular welding wire 12 and power via the welding wire feeder 14, and a shielding gas flow from the gas supply system 16 in order to perform GMAW of the workpiece 22. During operation, the welding torch 18 may be brought near the workpiece 22 so that an arc 34 may be formed between the consumable welding electrode (e.g., the tubular welding wire 12 exiting a contact tip of the welding torch 18) and the workpiece 22 to form a weld pool on the workpiece. Additionally, as discussed below, by controlling the composition of the tubular welding wire 12, the chemistry of the arc 34 and/or the resulting weld (e.g., composition and physical characteristics) may be tuned. For example, the tubular welding wire 12 may include any number of fluxing and/or alloying components that may act as arc stabilizers and, further, may become at least partially incorporated into the weld, affecting the mechanical properties of the weld. Furthermore, in certain embodiments, components of the tubular welding wire 12 may also provide additional shielding atmosphere near the arc 34, affect the transfer properties of the arc 34, and/or deoxidize the surface of the workpiece 22.

The welding wire feeder 14 also includes components for feeding the tubular welding wire 12 to the welding torch 18, and thereby to the welding application, under the control of a controller 36. For example, in certain embodiments, one or more wire supplies (e.g., a wire spool 38) of tubular welding wire 12 may be housed in the welding wire feeder 14. A wire feeder drive unit 40 may unspool the tubular welding wire 12 from the spool 38 and progressively feed the tubular welding wire 12 to the welding torch 18. To that end, the wire feeder drive unit 40 may include components such as circuitry, motors, rollers, and so forth, configured in a suitable way for establishing an appropriate wire feed. For example, in one embodiment, the wire feeder drive unit 40 may include a feed motor that engages with feed rollers to push wire from the welding wire feeder 14 towards the welding torch 18. Additionally, power from the welding power unit 13 may be applied to the fed wire.

However, during this wire feeding process, if the stiffness of the tubular welding wire 12 is insufficient, then the welding wire 12 may crumple, tangle, or otherwise improperly feed. For example, the tubular welding wire 12 may form a tangled "bird's nest" of welding wire (e.g., in the spool 38 and/or the wire feeder drive unit 40) instead of properly feeding to the welding torch 18. Since such wire misfeeds cause the welding operator ceasing welding operations to remove the improperly fed tubular welding wire 12, these misfeeds generally waste operator time and tubular welding wire 12. Additionally, in certain circumstances, such wire misfeeds may adversely affect operation of the welding system 10 (e.g., the welding wire feeder 40, the wire spool 38, or similar wire feeding components of the welding system 10), creating additional costs. Accordingly, certain embodiments of the presently disclosed tubular welding wire 12 utilize metal or metallic sheaths that include particular amounts of manganese and/or silicon. In certain embodiments, these higher-alloy metal sheaths demonstrate improved stiffness, which may generally improve the feeding of the tubular welding wire 12 through the welding system 10.

Figure 1B:
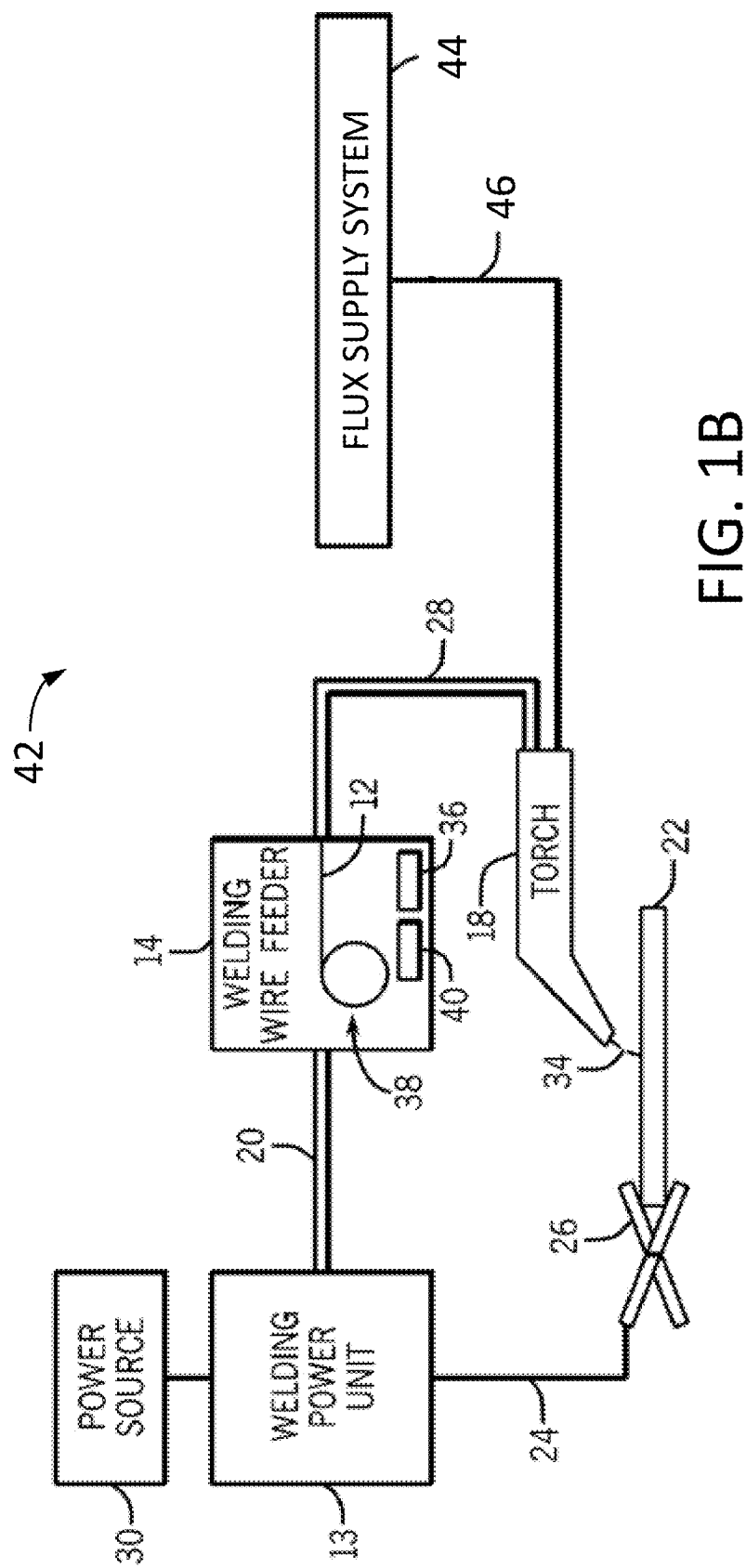
FIG. 1B is a block diagram of a submerged arc welding (SAW) system, in accordance with embodiments of the present disclosure.

As another example, FIG. 1B is a block diagram of an embodiment of a submerged arc welding (SAW) system 42 that utilizes a tubular welding wire 12, in accordance with the present disclosure. The SAW system 42 illustrated in FIG. 1B includes many of the same components illustrated in FIG. 1A (e.g., power source 30, welding power unit 13, welding wire feeder 14, and torch 18). However, the SAW system 42 illustrated in FIG. 1B does not include the gas supply system 16 illustrated in FIG. 1A for the GMAW system 10. Instead, the SAW system 42 includes a flux supply system 44 (e.g., a flux hopper) that stores and delivers a flow of granular SAW flux to the welding torch 18 via the conduit 46, and the welding torch 18 subsequently delivers the granular SAW flux to the surface of the workpiece 22, near the arc 34, forming a flux bed over the molten weld pool that shields the weld pool from the surrounding atmosphere. In certain embodiments, the conduit 46 may deliver the granular SAW flux to a flux delivery component that is separate from the welding torch 18.

A cross-section of an embodiment of the presently disclosed tubular welding wire 12 (or tubular welding rod) is illustrated in FIG. 2. The embodiment of the tubular welding wire 12 illustrated in FIG. 2 includes a metallic sheath 52 having a particular thickness 53 that encapsulates (e.g., surrounds, encircles) a granular or powdered core 54. Further, the tubular welding wire 12 may be described as having a particular outer diameter 55. Depending on the composition of the granular core 54, the tubular welding wire 12 may be a metal-core tubular welding wire or a flux-core tubular welding wire, in certain embodiments. In certain embodiments, the granular core 54 may include atmospheric scavenging components, gas forming components, and/or fluxing components that form a protective atmosphere near the weld deposit without using an external shielding gas. Additionally, in certain embodiments, the granular core 54 may be partially or completely absent, leaving a void within the tubular welding wire 12 (e.g., a hollow tubular welding wire).

In certain embodiments, the thickness 53 of the metallic sheath 52 may be between approximately 0.008 inches and 0.02 inches (e.g., between approximately 0.008 inches and approximately 0.016 inches, between approximately 0.01 inches and approximately 0.014 inches). In certain embodiments, the disclosed improved physical properties of the metallic sheath 52 facilitate good feeding of the tubular welding wire 12, even at high wire feed speeds (e.g., greater than 250 inches per minute, greater than 275 inches per minute, greater than 300 inches per minute). As mentioned, for a tubular welding wire 12 of a given diameter 55, as the thickness 52 of the metallic sheath 52 decreases, the internal volume within the tubular welding wire 12 increases, enabling the manufacture of welding wires having higher loading of granular core 54. In certain embodiments, the granular core 54 may account for between approximately 20% and approximately 60% (e.g., between approximately 25% and approximately 50%, between approximately 30% and approximately 40%) of the tubular welding wire 12 by weight. In certain embodiments, the tubular welding wire 12 may have a relatively large diameter 55 (e.g., between approximately 0.03 inches and approximately 0.25 inches, between approximately 0.04 inches and approximately 0.25 inches, between approximately 0.08 inches and approximately 0.16 inches, between approximately 0.1 inches and approximately 0.19 inches) in addition to a relatively thin metallic sheath 52 (e.g., between approximately 0.008 inches and approximately 0.02 inches).

The metallic sheath 52 may include any suitable metal or alloy (e.g., iron, high-carbon steel, low-carbon steel, or other suitable metal or alloy) having a manganese and/or silicon content, in accordance with aspects of the present techniques. For example, in certain embodiments, the metallic sheath 52 may include 80%, 90%, 95%, or 98% iron or steel. It should be appreciated that since the metallic sheath 52 generally provides at least a portion of the filler metal for the weld, the composition of the metallic sheath 52 generally affects the composition of the resulting weld. For example, in addition to the manganese and/or silicon, the metallic sheath 52 may include other additives or impurities (e.g., carbon, sulfur, phosphorus, copper, nickel, tin, chromium, and/or other elements) that may also affect the properties of the weld. For example, in certain embodiments, the metallic sheath 52 may include less than approximately 0.1%, or less than approximately 0.02% carbon by weight. In certain embodiments, the metallic sheath 52 may include between approximately 0.01% and 0.2%, between approximately 0.1% and 0.15%, between approximately 0.1% and 0.12%, or between approximately 0.12% and 0.15% carbon by weight. As discussed in greater detail below, in certain embodiments, the tubular welding wire 50 may include a carbon steel sheath having between approximately 0.08% and 0.15% carbon by weight, and by controlling the composition of the granular core 54 to include certain components (e.g., chromium, nickel, molybdenum), the tubular welding wire 50 may be designed to form a stainless steel weld deposit (e.g., a 300 series stainless weld deposit). While other 300 series welding wires use a stainless metallic sheath, it is presently recognized that a carbon steel sheath enables advantages over stainless metallic sheaths in terms of arc stability and reduced sticking, and certain present embodiments enable the formation of a stainless weld deposit using a carbon steel sheath 52. Additionally, in certain embodiments, the metallic sheath 52 may include less than approximately 0.02%, less than approximately 0.015%, or less than approximately 0.01% sulfur by weight. Furthermore, in certain embodiments, the metallic sheath 52 may include less than approximately 0.02%, less than approximately 0.015%, or less than approximately 0.01% phosphorus by weight.

With respect to the manganese content, in certain embodiments, the manganese content of the metallic sheath 52 may generally be greater than approximately 0.3% or 0.6% by weight. In certain embodiments, the metallic sheath 52 may include between approximately 0.1% and approximately 2% manganese by weight, between approximately 0.2% and approximately 1.9% manganese by weight, between approximately 0.6% and approximately 1.8% manganese by weight, between approximately 0.8% and approximately 2% manganese by weight, between approximately 0.9% and approximately 1.1% manganese by weight, or any subranges in between any of these values. With respect to the silicon content, in certain embodiments, the silicon content of the metallic sheath 52 may generally be greater than approximately 0.05% or 0.1% by weight. In certain embodiments, the metallic sheath 52 may include between approximately 0.1% and approximately 0.4 silicon by weight, 0.1% and approximately 0.3% silicon by weight, between approximately 0.2% and approximately 0.3% silicon by weight, between approximately 0.25% and approximately 0.35% silicon by weight, between approximately 0.3% and approximately 0.75% silicon by weight, between approximately 0.25% and approximately 0.75% silicon by weight, or any subranges in between any of these values. In particular, in certain embodiments, the metallic sheath 52 may include approximately 1% manganese and approximately 0.3% silicon by weight.

As mentioned, the manganese and/or silicon included in the metallic sheath 52 may affect the physical properties of the metallic sheath 52 and the tubular welding wire 12. For example, an embodiment of the metallic sheath 52 may have a fracture toughness such that only pressures greater than approximately 68,000 psi, or between approximately 68,000 psi and 69,000 psi, may induce fracture. In contrast, similarly sized metallic welding strips lacking the manganese and/or silicon content presently disclosed may have a fracture toughness such that pressures of between approximately 43,000 to 52,000 psi may induce fracture. Accordingly, the addition of the manganese and/or silicon to the metallic sheath 52 may generally provide improved mechanical and/or physical properties (e.g., fracture toughness, tensile strength, stiffness, and the like) that may improve the ability of the resulting tubular welding wire 12 to properly feed within the welding system 10.

The granular core 54 of the illustrated tubular welding wire 12 may generally be a compacted powder with a composition that, as discussed below, may include components (e.g., filler metals, fluxes, stabilizers, and the like) that affect the welding process. For example, in certain embodiments, the granular core 54 of the tubular welding electrode 12 may include elements (e.g., iron, titanium, barium, lithium, fluorine, or other elements) and/or minerals (e.g., pyrite, magnetite, and so forth) to provide arc stability and to control the chemistry of the resulting weld. The various components of the granular core 54 may be homogenously or non-homogenously (e.g., in clumps or clusters 56) disposed within the granular core 54. Since the manganese and/or silicon components of the tubular welding wire 12 may be provided by the metallic sheath 52, in certain embodiments, the granular core 54 may be substantially free (e.g., approximately 0% by weight, only including trace amounts, or less than approximately 0.01% or 0.05%) of manganese, of silicon, or of both manganese and silicon. For example, in certain embodiments, the granular core 54 of the tubular welding wire 12 may include less than 5%, 2%, 1%, 0.5%, 0.05%, or 0.01% manganese by weight. By further example, in certain embodiments, the granular core 54 of the tubular welding wire 12 may include less than 5%, 2%, 1%, 0.5%, 0.05%, or 0.01% silicon by weight. It should be appreciated that, under the conditions of the arc 34, the components of the tubular welding wire 12 (e.g., the metal sheath 52, the granular core 54, and so forth) may change physical state, chemically react (e.g., oxidize, decompose, and so forth), or become incorporated into the weld substantially unmodified by the weld process.

For example, in certain embodiments, the tubular welding wire 50 may conform to one or more standards under the American Welding Society (AWS) A5.22 specification for flux-cored welding wires that produce stainless weld deposits. By specific example, in certain embodiments, the tubular welding wire 50 may be a flux-cored tubular welding wire 50 having an AWS classification of EC308, EC308Si, EC308H, EC308L, or EC308LSi, wherein the granular core 54 includes between 19.5 wt % and 22.0 wt % chromium, between 9.0 wt % and 11.0 wt % nickel, and between 0.5 wt % and 0.75 wt % molybdenum, based on the weight of the tubular welding wire 50. In certain embodiments, the tubular welding wire 50 may be a flux-cored tubular welding wire 50 having an AWS classification of EC309, EC309Si, EC309L, or EC309LSi, wherein the granular core 54 includes between 23.0 wt % and 25.0 wt % chromium, between 12.0 wt % and 14.0 wt % nickel, and less than approximately 0.75 wt % molybdenum, based on the weight of the tubular welding wire 50. In certain embodiments, the tubular welding wire 50 may be a flux-cored tubular welding wire 50 having an AWS classification of EC316, EC316Si, EC316H, EC316L, or EC316LSi, wherein the granular core 54 includes between 18.0 wt % and 20.0 wt % chromium, between 11.0 wt % and 14.0 wt % nickel, and between 2.0 wt % and 3.0 wt % molybdenum, based on the weight of the tubular welding wire 50. For each of these example flux-cored tubular welding wires 50, all or a substantial portion (e.g., between approximately 90% and approximately 99.9%) of the manganese and silicon present within the tubular welding wire 50 may be present within the metallic sheath 52. Further, in certain embodiments, each of the aforementioned example flux-cored tubular welding wires 50 may include a carbon steel metallic sheath 52 (e.g., having a carbon content between approximately 0.01% and approximately 0.15% or between approximately 0.1% and approximately 0.15% by weight of the sheath 52) rather than a stainless (e.g., 300 series or 400 series) metallic sheath 52.

In certain embodiments, the tubular welding wire 50 may conform to one or more standards under the American Welding Society (AWS) A5.22 specification for metal-cored welding wires that produce stainless weld deposits. By specific example, in certain embodiments, the tubular welding wire 50 may be a metal-cored tubular welding wire 50 having an AWS classification of E308TX-X, E308HTX-X, or E308LTX-X, wherein the granular core 54 includes between 18.0 wt % and 21.0 wt % chromium, between 9.0 wt % and 11.0 wt % nickel, and less than approximately 0.75 wt % molybdenum, based on the weight of the tubular welding wire 50. In certain embodiments, the tubular welding wire 50 may be a metal-cored tubular welding wire 50 having an AWS classification of E309TX-X, E309HTX-X, or E309LTX-X, wherein the granular core 54 includes between 22.0 wt % and 25.0 wt % chromium, between 12.0 wt % and 14.0 wt % nickel, and less than approximately 0.75 wt % molybdenum, based on the weight of the tubular welding wire 50. In certain embodiments, the tubular welding wire 50 may be a metal-cored tubular welding wire 50 having an AWS classification of E316TX-X or E316HTX-X, wherein the granular core 54 includes between 17.0 wt % and 20.0 wt % chromium, between 11.0 wt % and 14.0 wt % nickel, and between 2.0 wt % and 3.0 wt % molybdenum, based on the weight of the tubular welding wire 50. For each of these example metal-cored tubular welding wires 50, all or a substantial portion (e.g., between approximately 90% and approximately 99.9%) of the manganese and silicon present within the tubular welding wire 50 may be present within the metallic sheath 52. Further, in certain embodiments, each of the aforementioned example metal-cored tubular welding wires 50 may include a carbon steel metallic sheath 52 (e.g., having a carbon content between approximately 0.01% and approximately 0.15% or between approximately 0.1% and approximately 0.15% by weight of the sheath 52) rather than a stainless (e.g., 300 series or 400 series) metallic sheath 52. It may be appreciated that certain classifications disclosed herein, such as low-carbon classifications designated by "L," may require that the carbon content of the weld deposit be particularly low (e.g., 0.03% by weight of the weight deposit or less). For embodiments of the tubular welding wire 50 designed for such classifications, the amount of carbon in the sheath 52 may be particularly low (e.g., between approximately 0.01% and 0.03% by weight of the sheath 52) and the core 54 may be substantially free (e.g., less than approximately 0.01% by weight of the core 54) of carbon to meet this requirement of the classification.

Figure 3:
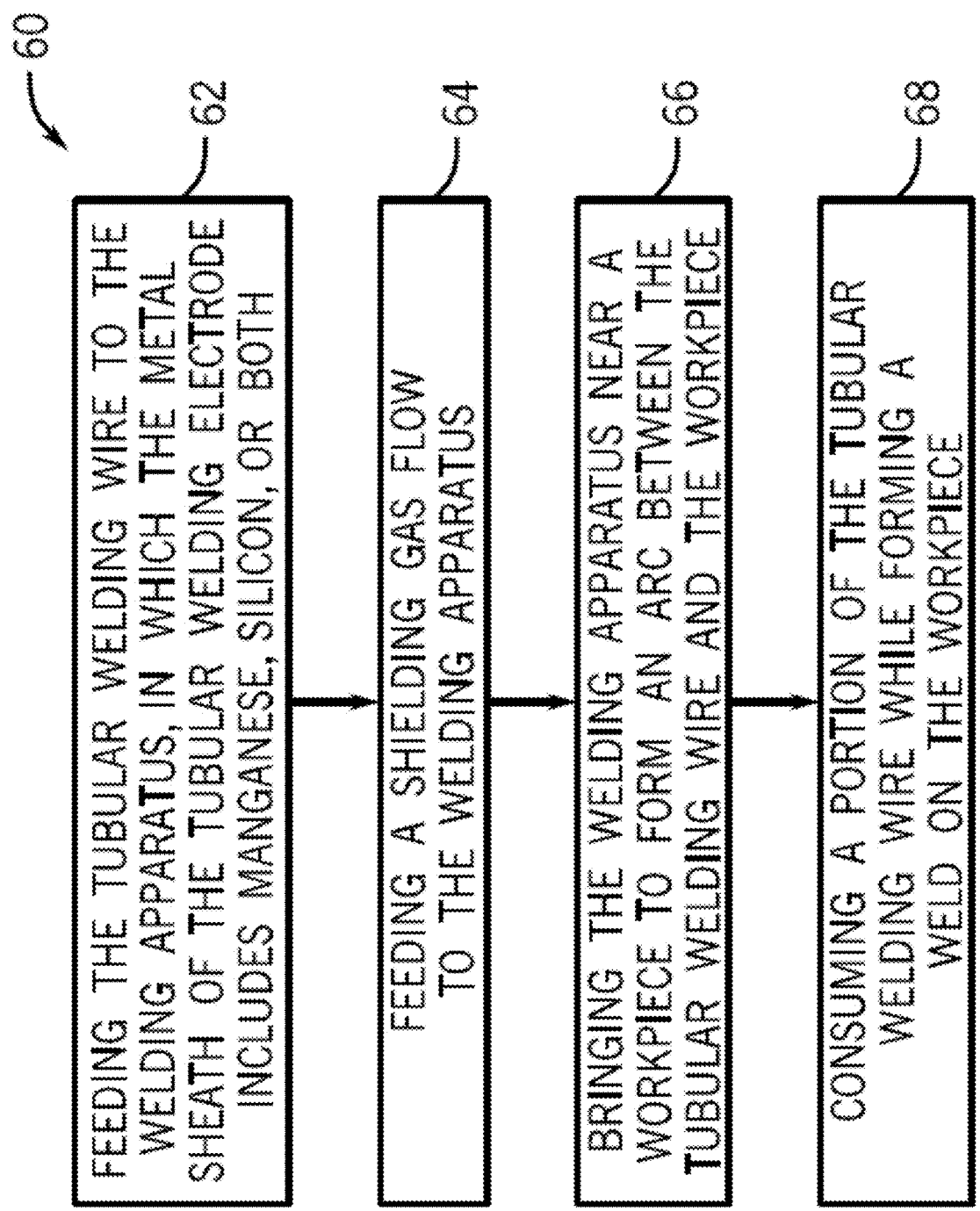
FIG. 3 is a flow chart of a process by which the tubular welding electrode may be used to weld a workpiece using the GMAW system of FIG. 1A, in accordance with embodiments of the present disclosure.

FIG. 3 is a flow chart of an embodiment of a process 60 by which a workpiece 22 may be welded using the GMAW welding system 10 of FIG. 1A and the tubular welding electrode 12, which includes a metal sheath 52 having manganese, silicon, or both. The illustrated process 60 begins with feeding (block 62) the tubular welding wire 12 to a welding apparatus (e.g., the welding torch 18), in which the tubular welding wire 12 includes manganese and/or silicon. Additionally, the process 60 includes feeding (block 64) a shielding gas flow (e.g., 100% argon, 75% argon/25% carbon dioxide, 90% argon/10% helium, or similar shielding gas flow) to the welding apparatus (e.g., the contact tip of the welding torch 18). In other embodiments, welding systems may be used that do not use a gas supply system (e.g., such as the gas supply system 16 illustrated in FIG. 1A), and one or more components (e.g., aluminum, iron, various fluoride salts, or other components) of the tubular welding wire 12 may provide component protective atmosphere near the weld deposit. Next, the tubular welding wire 12 may be brought near (block 66) (e.g., 0.25 mm, 0.5 mm, 1 mm, 2 mm, 3 mm, 5, mm, 10 mm, or generally less than 30 mm away from) the workpiece 22 such that an arc 34 may be formed between the tubular welding wire 12 and the workpiece 22. It should be appreciated that the arc 34 may be produced using a DCEP, DCEN, DC variable polarity, balanced or unbalanced AC power configuration for the GMAW system 10. Furthermore, in certain embodiments (e.g., the SAW welding systems 42 of FIG. 2), a granular SAW flux may be delivered at or near the arc and/or weld pool in order to provide at least a portion of the atmosphere at or near the arc and/or weld pool in addition to (or in alternative to) the shielding gas flow. Then, a portion of the tubular welding wire 12 is consumed (block 68) while forming the weld on the workpiece 22. In certain embodiments, the manganese and/or silicon disposed in the metallic sheath 52 may be liberated to interact with the arc 34 and/or, at least partially, become incorporated into the weld.

It may generally be appreciated that the loading of components (e.g., manganese and/or silicon) into the metal sheath 52 rather than the granular core 54 may also have an effect on how these materials react in the arc 34 and/or are incorporated into the welding process. That is, an advantage of disposing the manganese and/or silicon in the metallic sheath 52 rather than the granular core 54 may be that a greater portion of the manganese and/or silicon reaches the weld pool (e.g., rather than forming fumes). In other words, there may be substantial or subtle differences in the arc 34 and/or weld pool conditions (e.g., temperature, voltage, relative positions of reactants, and the like) experienced by the manganese and/or silicon components delivered via the metallic sheath 52 rather than by the granular core 54. Accordingly, in certain embodiments, the disclosed tubular welding wire 12 may produce fumes having a lower manganese concentration than other welding wires having manganese supplied by the granular core 54. Furthermore, in certain embodiments, the total amount of a component (e.g., manganese and/or silicon) that may be used when delivering the component via the metallic sheath 52 may be substantially less than the amount of the component used when delivering the component to the weld via the granular core 54, since less of the component may be consumed in the formation of welding byproducts (e.g., fumes and/or slag).

Additionally, as mentioned, in certain embodiments, the disclosed tubular welding wires 12 are believed to enable higher deposition rates using the same welding current and/or enable comparable deposition rates at lower welding current than other welding wires. As mentioned, the disclosed compositions of the metallic sheath 52 generally enable improved work hardening and improved stiffness for better feeding of the tubular welding wire 12. Accordingly, as mentioned, the disclosed metallic sheath 52 enables the manufacture of tubular welding wires 12 having a relatively thin sheath (e.g., between approximately 0.008 inches and approximately 0.016 inches), a relatively large diameter (e.g., greater than 0.04 inches, greater than 0.1 inches), and a relatively high loading of the granular core 54 (e.g., between approximately 10% and 60%, between approximately 20% and 60%, or between approximately 20% and 40% of the tubular welding wire 12 by weight). It is believed that certain embodiments of the tubular welding wire 12 will enable deposition rates greater than 25 pounds per hour (lbs/hr) and wire feed speeds greater than 275 inches per minute (ipm) at a weld current of 600 ampere (amp) or less; deposition rates greater than 18 lbs/hr and wire feed speeds greater than 200 ipm at 500 amps or less; deposition rates greater than 13 lbs/hr and wire feed speeds greater than 145 ipm at 400 amps or less; and/or deposition rates greater than 8 lbs/hr and wire feed speeds greater than 95 ipm at 300 amps or less. Accordingly, it is believed that certain embodiments of the tubular welding wire 12 will enable deposition rates greater than approximately 0.02 pounds per hour per ampere (lbs/hr/amp), greater than approximately 0.025 lbs/hr/amp, greater than approximately 0.03 lbs/hr/amp, or greater than approximately 0.04 lbs/hr/amp. As mentioned above, the relatively high amount of weld deposition formed per ampere of welding current, which enables weld deposits to be formed quickly without as much heat being delivered to the workpiece, thereby reducing the HAZ of the workpiece.

Figure 4:
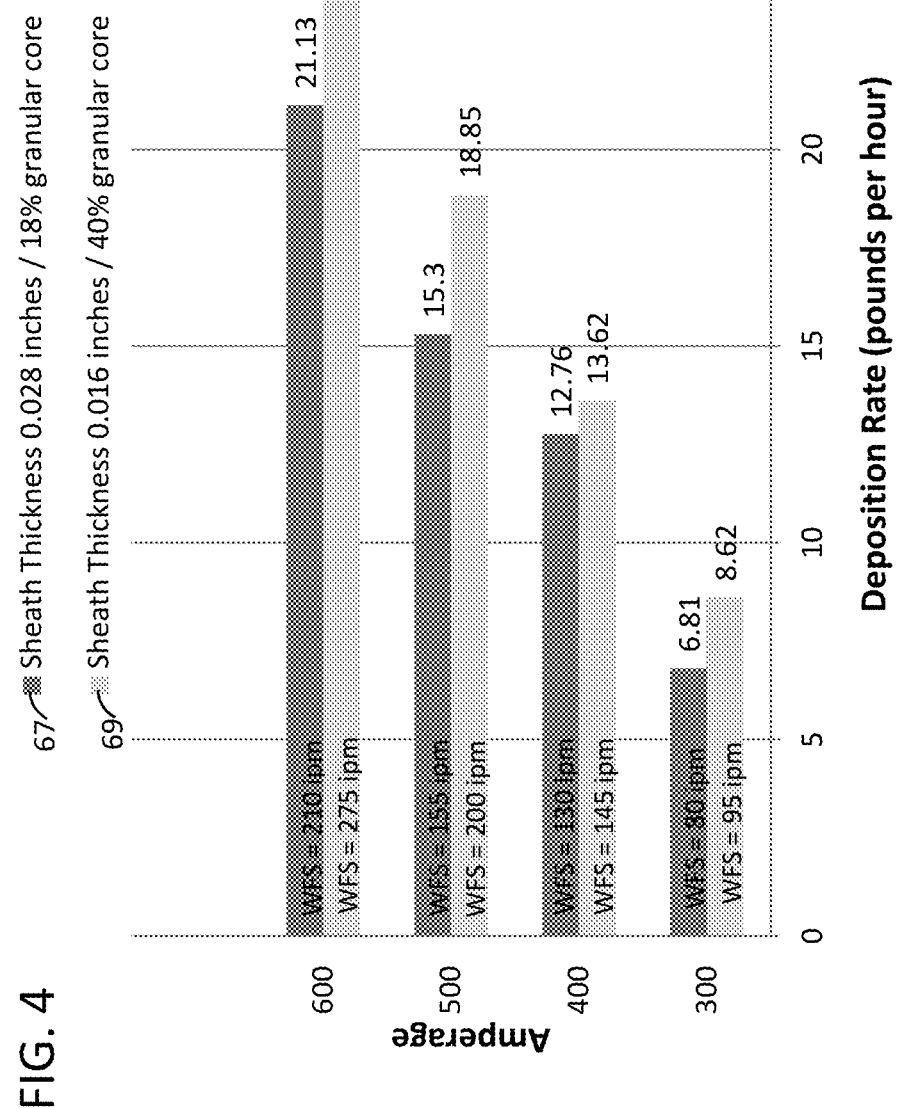
FIG. 4 is a graph illustrating welding current versus weld deposit deposition rate for two model tubular welding wires.

For example, the graph 65 of FIG. 4 illustrates a comparison between the deposition rates of two model tubular welding wires having metallic sheaths of standard compositions. The first welding wire 67 illustrated in the graph 65 has a diameter of approximately 0.094 inches (3/32 inches), a metal sheath that is 0.028 inches thick, and a granular core that accounts for 18% of the total weight of the wire. The second welding wire 69 illustrated in the graph 65 has a diameter of approximately 0.094 inches (3/32 inches), a metal sheath that is 0.016 inches thick, and a granular core that accounts for 40% of the total weight of the wire. The graph 65 illustrates the deposition rates for the two welding wires 67 and 69 as a function of amperage, and further includes the wire feed speed (WFS) for each welding operation in inches per minute (ipm). As illustrated, the second welding wire 69 enables deposition rates that are greater than the deposition rates of the first welding wire 67 (e.g., approximately 23% greater at 600 amps, approximately 23% greater at 500 amps, approximately 7% greater at 400 amps, approximately 27% greater at 300 amps). Further, the second welding wire 69 enables a higher wire feed speed than the first welding wire 67 at each amperage (e.g., approximately 31% greater at 600 amps, approximately 30% greater at 500 amps, approximately 12% greater at 400 amps, and approximately 19% greater at 300 amps). As such, while the first and second welding wires 67 and 69 presented in FIG. 4 do not include a metallic sheath having the composition set forth above, the graph 65 illustrates the general advantages of thinner metallic sheaths 52 and higher loading of the granular core 54 in terms of deposition rates and wire feed speeds. Therefore, for present embodiments of the tubular welding wire 12, in which the toughness and/or stiffness of the metallic sheath 52 exceeds that of the sheaths of the model welding wire 69 represented in FIG. 4, it is believed that deposition rates and/or wire feed speeds may be attained that are greater than or equal to the deposition rates and/or wire feed speeds of the model welding wire 69.

Figure 5:
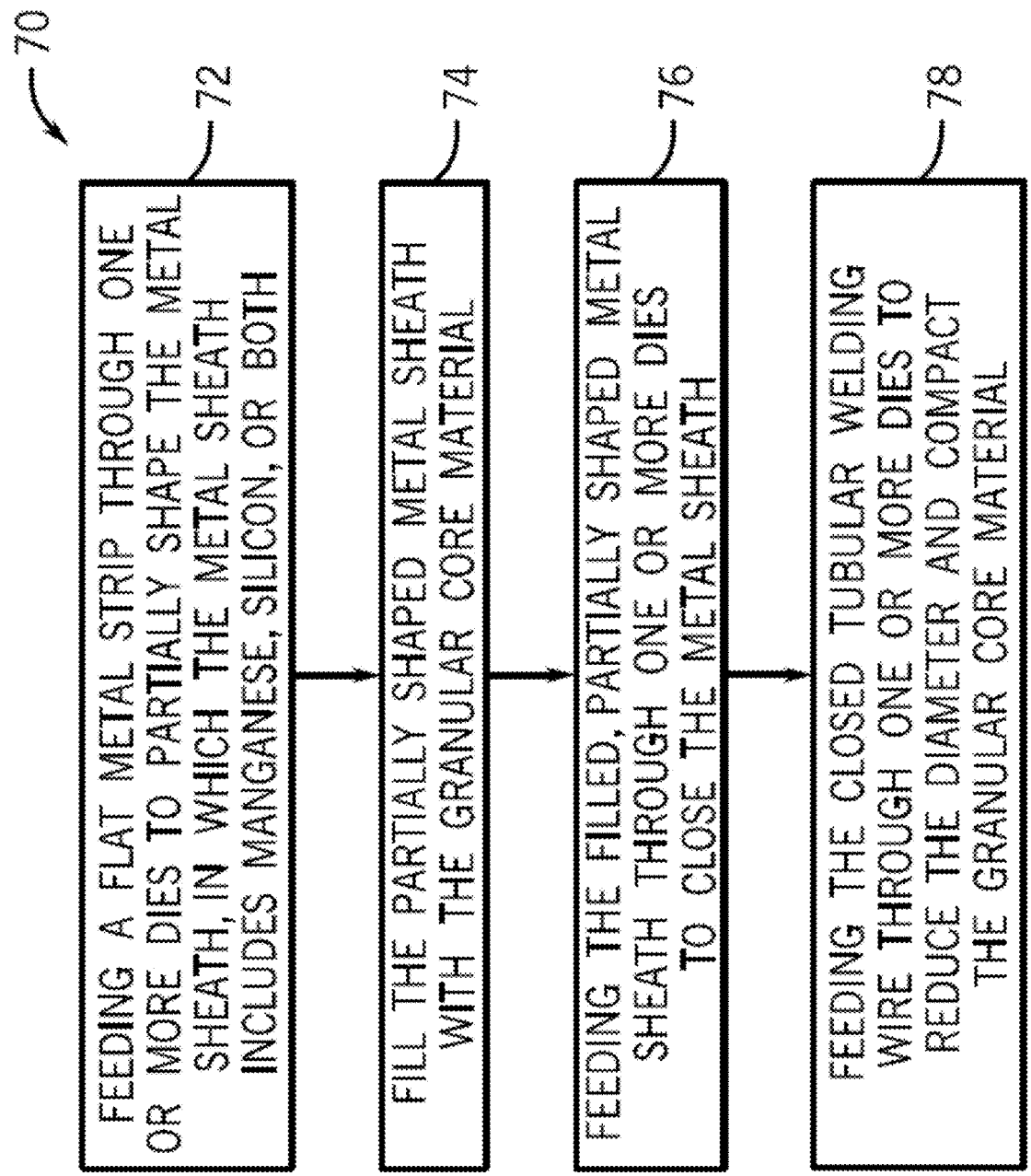
FIG. 5 is a flow chart of a process for manufacturing the tubular welding electrode, in accordance with embodiments of the present disclosure.

FIG. 5 is a flow chart of an embodiment of a process 70 by which the tubular welding electrode 12 may be manufactured. The process 70 begins with a flat metal strip (i.e., including manganese, silicon, or both) being fed (block 72) through a number of dies that shape the strip into a partially circular metal sheath 52 (e.g., producing a semicircle or trough). After the metal strip has been at least partially shaped into the metal sheath 52, it may be filled (block 74) with the granular core material 54. Accordingly, the partially shaped metal sheath 52 may be filled with various powdered fluxing and alloying components (e.g., iron, iron oxide, fluoride salts, or similar fluxing and/or alloying components). In certain embodiments, no manganese or silicon components may be added to the partially shaped metal sheath 52. Once the partially shaped metal sheath 52 has been filled with the various components of the granular core 54, the partially shaped metal sheath 52 may then be fed through (block 76) one or more dies that may generally close the metal sheath 52 such that it substantially surrounds the granular core material 54 (e.g., forming a seam 58, such as shown in FIG. 2). Additionally, the closed metal sheath 52 may subsequently be fed through (block 78) a number of dies (e.g., drawing dies) to reduce the diameter of the tubular welding wire 12 by compressing the granular core material 54. In other embodiments, the tubular welding wire 12 may be formed by packing the granular core 54 within a hollow metallic cylinder that serves as the metallic sheath 52, and the hollow metallic cylinder may subsequently be drawn to reduce the diameter of the hollow metallic cylinder and pack the granular core 54 to yield a tubular welding wire 12 that lacks the seam 58 illustrated in FIG. 2.

It should be appreciated that while improving the stiffness of the metal sheath of a tubular welding wire 12 may improve the feeding of tubular welding wire 12, this approach also presents certain challenges. For example, by increasing the stiffness of the metal sheath 52 of the tubular welding electrode 12, the amount of cold working used to shape the metal sheath 52 around the granular core 54 (e.g., in blocks 72, 76, and 78) may also increase. Furthermore, since the hardness of the metal sheath 52 may also increase with the addition of the manganese and/or silicon components, the aforementioned dies (e.g., in blocks 72, 76, and 78) that may be used to shape the metal sheath 52 around the granular core 54 may wear more quickly due to the increased stiffness and/or hardness of the tubular welding wire 12. Additionally, the dies used to shape the metal sheath 52 during the manufacture of the tubular welding wire 12 may be manufactured from a material also having improved mechanical properties (e.g., a harder or tougher die material) in order to accommodate the altered mechanical properties of the disclosed tubular welding wire 12 embodiments. As such, there may be design challenges when attempting to improve the feeding of tubular welding wire 12 by increasing the stiffness of the metal sheath 52, as presently disclosed.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A tubular welding wire for arc welding, comprising:
a metal sheath including iron, high-carbon steel, or low-carbon steel that surrounds a granular core,
wherein the metal sheath comprises between 0.6% and 2.0% manganese by weight, between 0.05% and 2% silicon by weight, between 0.01% and 0.2% carbon by weight, less than 0.02% sulfur by weight, and less than 0.02% phosphorus by weight,
wherein the metal sheath has a thickness of between 0.008 inches and 0.02 inches,
wherein the tubular welding wire is configured to form a weld deposit on a workpiece at a deposition rate of at least 0.02 pounds per hour per ampere (lbs/hr/amp) of welding current,
wherein the granular core comprises less than 2% manganese by weight, and less than 2% silicon by weight,
wherein the granular core comprises 50% or more of the tubular welding wire by weight, and
wherein the tubular welding wire has an outer diameter of between 0.03 inches and 0.25 inches.

2. The tubular welding wire of claim 1, wherein the metal sheath comprises between 0.9% and 1.1% manganese by weight and between 0.1% and 0.4% silicon by weight.

3. The tubular welding wire of claim 2, wherein the metal sheath comprises 1% manganese by weight and 0.3% silicon by weight.

4. The tubular welding wire of claim 1, wherein the thickness of the metal sheath is between 0.008 inches and 0.016 inches.

5. The tubular welding wire of claim 1, wherein the tubular welding wire has an outer diameter between 0.03 inches and 0.25 inches.

6. The tubular welding wire of claim 5, wherein the tubular welding wire has an outer diameter between 0.04 inches and 0.10 inches.

7. The tubular welding wire of claim 1, wherein the granular core comprises between 50% and 60% of the tubular welding wire by weight.

8. The tubular welding wire of claim 7, wherein the granular core comprises between 20% and 40% of the tubular welding wire by weight.

9. The tubular welding wire of claim 1, wherein the tubular welding wire is configured to form a stainless weld deposit.

10. The tubular welding wire of claim 1, wherein the granular core comprises less than 1% manganese by weight and less than 1% silicon by weight.

11. The tubular welding wire of claim 10, wherein the granular core comprises less than 0.01% manganese by weight and less than 0.01% silicon by weight.

12. The tubular welding wire of claim 1, wherein the metal sheath comprises between 0.01% and 0.15% carbon by weight.

13. The tubular welding wire of claim 1, wherein the tubular welding wire is configured for use in conjunction with a granular submerged arc welding (SAW) flux that shields the weld pool from the surrounding atmosphere during SAW.

14. The tubular welding wire of claim 1, wherein the tubular welding wire is configured to form a weld deposit on a workpiece at a deposition rate of at least 0.03 lbs/hr/amp of welding current.

15. The tubular welding wire of claim 14, wherein the deposition rate is at least 0.04 lbs/hr/amp.

16. A method of manufacturing a tubular welding wire for arc welding, comprising:
   disposing a granular core inside of a metallic sheath, wherein the metal sheath includes iron, high-carbon steel, or low-carbon steel, wherein the granular core comprises less than 2% manganese by weight, and less than 2% silicon by weight, wherein the metal sheath comprises between 0.6% and 2.0% manganese by weight, between 0.05% and 2% silicon by weight, between 0.01% and 0.2% carbon by weight, less than 0.02% sulfur by weight, and less than 0.02% phosphorus by weight, wherein the metal sheath has a thickness of between 0.008 inches and 0.02 inches, and wherein the granular core comprises 50% or more of the tubular welding wire by weight; and
   compressing the granular core within the metallic sheath to yield the tubular welding wire, wherein the tubular welding wire has a outer diameter between 0.03 inches and 0.25 inches, and wherein the tubular welding wire is configured to form a weld deposit on a workpiece at a deposition rate of at least 0.02 lbs/hr/amp of welding current.

17. The method of claim 16, wherein the metal sheath comprises between 0.9% and 1.1% manganese by weight and between 0.1% and 0.4% silicon by weight.

18. The method of claim 16, wherein the thickness of the metal sheath is between 0.01 inches and 0.014 inches.

19. The method of claim 16, wherein the outer diameter of the tubular welding wire is between 0.07 inches and 0.09 inches.

20. The method of claim 16, wherein disposing the granular core inside of the metallic sheath comprises disposing the granular core within a seamless metal tube.

21. The method of claim 16, wherein the granular core comprises less than 1% manganese by weight and comprises less than 1% silicon by weight.

22. The method of claim 16, wherein the granular core comprises between 50% and 60% of the tubular welding wire by weight.

23. The tubular welding wire of claim 1, wherein the granular core comprises between 18.0% and 21.0% chromium, between 9.0% and 11.0% nickel, and less than 0.75% molybdenum, by weight of the tubular welding wire.

24. The tubular welding wire of claim 1, wherein the granular core comprises between 22.0% and 25.0% chromium, between 12.0% and 14.0% nickel, and less than 0.75% molybdenum, by weight of the tubular welding wire.

25. The tubular welding wire of claim 1, wherein the granular core comprises between 17.0% and 20.0% chromium, between 11.0% and 14.0% nickel, and between 2.0 wt % and 3.0 wt % molybdenum, by weight of the tubular welding wire.

26. The method of claim 16, wherein the granular core comprises between 18.0% and 21.0% chromium, between 9.0% and 11.0% nickel, and less than 0.75% molybdenum, by weight of the tubular welding wire.

27. The method of claim 16, wherein the granular core comprises between 22.0% and 25.0% chromium, between 12.0% and 14.0% nickel, and less than 0.75% molybdenum, by weight of the tubular welding wire.

28. The method of claim 16, wherein the granular core comprises between 17.0% and 20.0% chromium, between 11.0% and 14.0% nickel, and between 2.0 wt % and 3.0 wt % molybdenum, by weight of the tubular welding wire.

* * * * *